March 30, 1937.  J. K. DELANO  2,075,024
ADAPTER BUSHING
Filed March 27, 1935
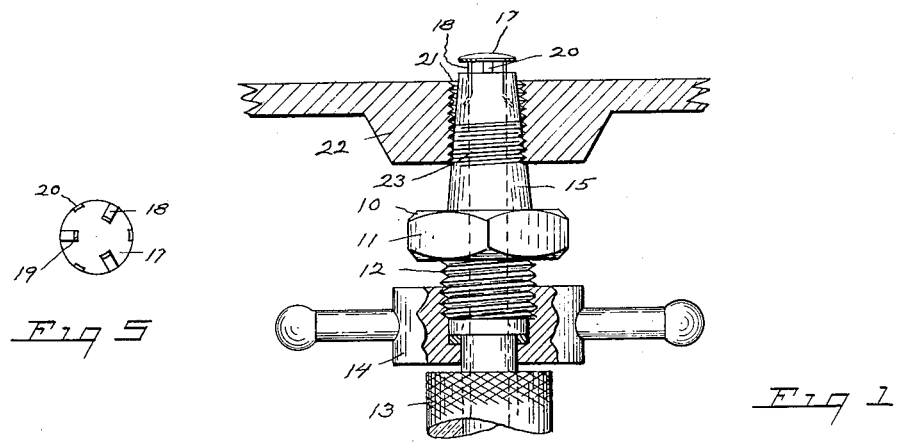
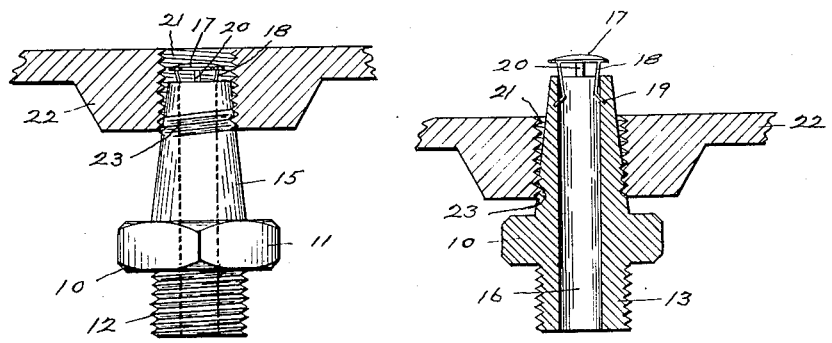
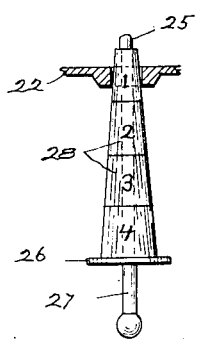
Inventor
James K. Delano.
Attorney Patented Mar. 30, 1937

2,075,024

UNITED STATES PATENT OFFICE 2,075,024

ADAPTER BUSHING

James K. Delano, Poughkeepsie, N. Y.

Application March 27, 1935, Serial No. 13,201

1 Claim. (Cl. 285—55)

This invention relates to an adapter bushing for temporarily securing or attaching the end of a service hose or pipe to tapped holes of various diameters and threads, within the range of the particular size of adapter bushing which is used, each size of adapter bushing being capable of use with a number of different size holes and threads, so that with a few adapter bushings a large number of different size holes and threads may be taken care of.

My invention is more particularly adapted for use with automobile crank-case flushers and cleaners, for attaching thereto the service hose of the flusher to the drain hole in a secure and tight manner.

A survey of the different makes of automobiles now in use shows that the size, threads and location of the drain openings of the crank-cases or pans vary from less than one inch in diameter to more than several inches, so that if the service hose of the cleaning apparatus were to be attached by the usual type of threaded bushing, it would require a special size and type of bushing for each size and type of drain hole, necessitating that the service station carry all of the required sizes on hand.

In the cleaning and flushing of crank-cases it has been the practice for the attendant at the service station, either to insert the nozzle of the service hose into the drain hole and to hold it therein with his hand, or to secure the hose to some form of support and to catch the drip or discharge in a funnel or other receptacle, but this method is only good where a natural drainage is employed, and will not work where any suction method of cleaning is used as a tight joint is required between the hose and the drain hole.

In any form of hose or pipe connection where either or both an injection or suction is present, it is important that the hose or pipe be securely connected to the drain opening to provide a tight joint, and some universal and quick method or device must therefore be employed and one requiring the minimum number of pieces, adapters or bushings for the greatest number of different sizes of drain openings and different threads.

To provide such a means, I have devised an adapter bushing, one end of which is secured to the end of the service hose or pipe with the standard hose coupling thread, and the other end is so designed that it may be readily and tightly secured within the threaded opening in the crank-case wherever located, thus providing a device that is so designed that each of the adapter bushings will take care of a number of different size drain openings and threads.

This I have accomplished by constructing the adapter bushing of a semi-soft material such as, lead, Babbitt metal, etc., and forming the same with a tapered body portion adapted to be entered into the threaded drain opening and by being given a few turns therein, threads or parts of threads will be cut upon the smooth tapered portion by the threads of the drain opening, thus providing a secure means for forming a tight and secure joint or connection.

The adapter bushing being easily removed and capable of many repeated uses within its range of size, as each application will cut new threads upon its tapered portion over those already there, without damage owing to the soft material from which it is composed.

In practice, I have found that four or five different sizes of adapter bushings so designed that the largest diameter of one adapter corresponds to the small diameter of the next in size, and so on, each adapter bushing having the same taper but varying in diameter at its tapered portion, will accommodate all of the different sizes and threads of the tapped drain openings of the usual makes of automobiles, except in a few special cases.

In the use of the adapter bushing, it is intended that the attendant at the service station, first determine which size of adapter bushing is to be used for that particular job, and this is accomplished, by inserting into the drain opening, a gage which corresponds to the adapter bushings and which will indicate by its number, which of the adapter bushings is to be employed.

The object of the invention is to provide an adapter bushing for attaching service hoses or pipes to threaded holes of different diameters.

Another object of the invention is to provide a device of this class by which a quick and tight joint may be effected between a service hose and a drain hole.

Another object being to provide a device of this kind that can be used for a number of times and in connection with threaded holes of different diameters and which will always provide a tight joint.

With these and other objects in view, my invention consists in certain new and useful construction and combination of parts as will hereinafter be fully described and claimed, and further illustrated in the accompanying drawing which forms a part hereof and in which like figures of reference refer to corresponding parts in all of the views, and it is understood that slight changes may be made without departing from the spirit of the invention.

In the drawing:

Figure 1 is a vertical sectional view showing the device attached both to a service hose and to the threaded drain opening of a crank-case.

Figure 2 is a similar view of the same size of adapter bushing, but attached to a smaller diameter of drain opening.

Figure 3 is a similar view of the same size of adapter bushing, but showing it attached to a larger diameter of drain opening.

Figure 4 shows a form of gauge that may be employed for ascertaining the correct size of adapter to be used.

Figure 5 is an enlarged bottom plan view of the cap for the tapered end of the plug.

Referring to the drawing:

The device as here shown comprises a body portion 10 provided with the flats 11 for a wrench or other tool by which the device may be inserted and removed from the hole.

Integral with this body portion is a hose attaching threaded nipple 12, to which is attached the hose 13 by the usual coupling 14 or other suitable means.

The upper part of the device comprises a tapered plug 15 also integral with the body 10, the entire device being formed of semi-soft material, such as lead, babbitt, etc., and provided with an axial bore 16 extending therethrough, while the upper or small end of said bore 16 is provided with a cap 17 which is formed with the attaching legs 18 extending into the bore 16 and having bent ends 19 pressed into the wall of the bore 16, while the stops 20 rest upon the end of the tapered portion 15 to space the cap 17 from the end of the bore 16 to form a nozzle by which the flow through the bore 16 is broken up.

The sides of the tapered plug 15 are smooth, but when the device is entered and rotated within the threaded hole 21 in the crank-case 22, as shown in the drawing, the threads of the hole 21 will cut corresponding threads 23 upon the smooth sides of the tapered plug 15 by which it will be retained within the threaded hole 21 in a secure and tight manner until backed out by a wrench upon the body 10.

It will thus be seen that should the adapter bushing be first inserted into a small threaded hole as indicated in Figure 2, the threads will be cut near the outer end of the tapered plug 15, and then if the same adapter bushing is inserted into a larger diameter hole as shown in Figure 3, the threads will be cut nearer the base of the plug, thus effecting a tight joint in either case, and should the same adapter bushing be inserted into a threaded hole having a different size of thread, the new threads will cross thread with the old threads upon the plug and will not affect the tightness of the joint.

Thus the same adapter bushing may be used many times with the same or different size drain holes and always provide a secure and tight joint.

The gauge shown, comprises a rod 25 secured into a base 26 and having a handle 27, and upon the rod 25 are mounted a series of taper plug gauges 28 corresponding to each of the adapter bushings and having a corresponding number. This gauge is inserted into the drain hole, and whichever of the plug gauges 28 fits the hole will indicate which of the adapter bushings is to be used.

Having thus described my invention, what I claim as new and desire to secure by Letters Patent, is:

A bushing for insertion in the opening of a crank case, said opening being of uniform diameter and having its wall threaded throughout its length, the bushing including a tubular member having its outer surface tapered throughout its length and initially unthreaded, the minor end of the member being of a diameter less than the diameter of the opening, the major end of the member being of a diameter greater than the opening, whereby when the member is rotated in the opening the member will have cut therein at least some of the threads of the wall opening in its minor or major end, or intermediate such ends, whether the member is partly or fully extended into the opening.

JAMES K. DELANO.